March 2, 1937. H. G. GEISSINGER 2,072,204
MEASUREMENT AND CONTROL OF THE FLOW OF VISCOUS FLUIDS
Filed Aug. 23, 1934 2 Sheets-Sheet 2
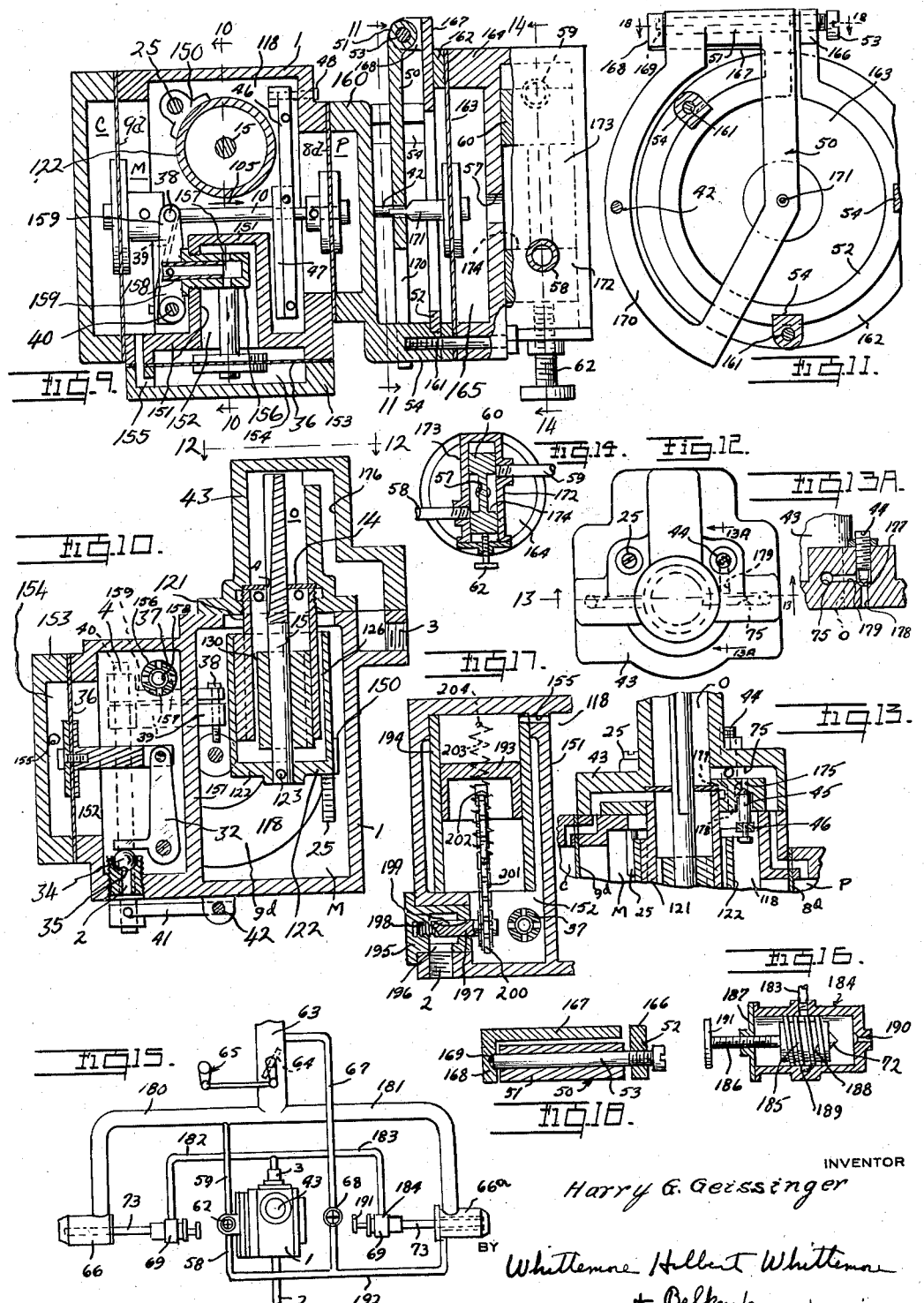
INVENTOR
Harry G. Geissinger
BY Whittemore Hulbert Whittemore + Belknap
ATTORNEYS Patented Mar. 2, 1937

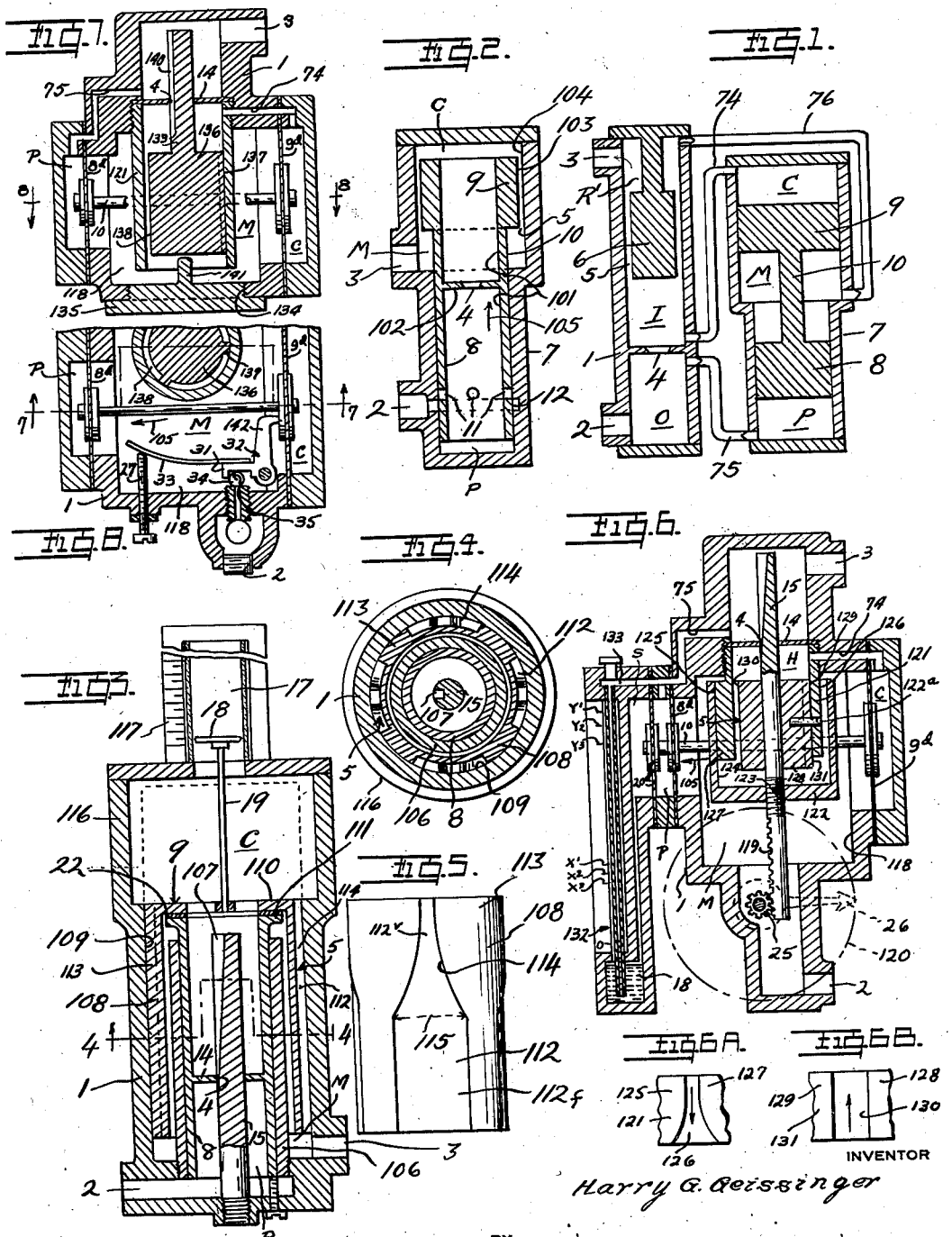

2,072,204

UNITED STATES PATENT OFFICE 2,072,204

MEASUREMENT AND CONTROL OF THE FLOW OF VISCOUS FLUIDS

Harry G. Geissinger, Detroit, Mich.

Application August 23, 1934, Serial No. 741,173

14 Claims. (Cl. 137—139)

My invention relates to the measurement and control of the flow of viscous fluids.

The primary object of my invention is to provide a new method for measuring and controlling viscous liquids under variable conditions with extreme accuracy.

Another object is to provide improved apparatus for accurately measuring and controlling viscous liquids.

A further object is to provide a new type of metering control apparatus which can be utilized for automatic control and can be adapted to a great variety of uses in view of its extreme accuracy.

Other objects will be more apparent as the description of the invention proceeds.

In the present state of the art the devices called "flow meters" are well known. They consist essentially of a restricted orifice and means to measure the difference of pressure created by the volume of fluid passing through the orifice. The present day conception of this difference of pressure is that it is due to the "velocity head", and the indications are modified by a variety of "coefficients of discharge" to conform to the actual flow. In the measurement of water these coefficients are variable with the size of the pipe, and size of the orifice, rate of flow, and temperature of the water. Modern literature does not explain this variety of coefficients. It is also well known that when "flow meters" of the orifice type are used to measure the fuel oil or other viscous fluids the "coefficients of discharge" show such wide variations with different rates of discharge and different viscosities as to become useless.

In the metering and control of oil in its major application in the arts, that is the control of combustion, the rate of flow determined by commercial sizes of oil burners, the convenient difference of pressure in the device and the presence of granular matter in modern fuel oil, make it advisable to use orifices of such a size that the resulting velocities fall within the range of viscous or "stream-line" flow.

My research in the flow of viscous fluids within the range of "stream-line" flow shows that contrary to prior knowledge the coefficient of discharge is constant and the difference of pressure around an orifice is a sum of two pressures, represented by the equation (1) $$P = \frac{A \cdot G^2 \cdot sp}{k^2} + R \cdot V \cdot G.$$

wherein $P$=orifice pressure, $G$=rate of flow, $k$= coefficient of discharge, $sp$=specific gravity, $V$= viscosity, and $A$ and $R$ are dimensional factors relating to the size of the orifice. The factor $R$ is derived from observation of the pressure developed by the flow of fluid having a certain viscosity and measured at different rates of flow.

My invention in its broader aspects consists in providing a method and apparatus for measuring and controlling viscous fluid flow which compensates for the viscosity effect in the orifice or other primary constriction as represented by the second part of the above equation by introducing into the system a device which I have termed a "resistor". This resistor is so designed and constructed as to offer a predeterminable resistance to the flow of the fluid which varies with the velocity and the rate of flow as well as with the dimensions of the fluid channel forming the resistors. For reasons hereinafter more fully pointed out, it is desirable that this channel should have the greatest "wetted surface" possible and therefore the resistor preferably takes the form of an annular channel of substantial length and relatively small thickness between the walls. The difference of pressure around such a resistor may be represented by the equation (2) $$p = r V \cdot G.$$

where $p$=pressure and $r$ is a dimensional factor corresponding to the loss in pressure in pipes carrying viscous fluids at stream-line velocities.

According to my invention, I arrange in a fluid passageway both an orifice or other constricted area and a resistor and I then transmit the fluid pressure intermediate the orifice and resistor and the pressures exterior to the orifice and resistor respectively to a compound piston or other equivalent pressure responsive means which is so constructed as to balance out the forces due to the viscosity effect in the orifice and to be maintained in a state of equilibrium by factors independent of viscosity.

This will be more fully understood by referring to the accompanying drawings, in which Figure 1 is a diagram in longitudinal section illustrating the principle of my invention.

Figure 2 is a longitudinal section through a device embodying my invention in one of its simpler forms.

Figure 3 is a longitudinal section through a metering device embodying my invention.

Figure 4 is a cross section on the line 4—4 of Figure 3.

Figure 5 is a side elevation of the sleeve 108.

Figure 6 is a vertical section through a balancing type meter.

Figure 6A is a fragmentary side view of sleeve 121 showing variable channels 126 therein.

Figure 6B is a fragmentary side view of core 128 showing channels 130 of constant width.

Figure 7 is a sectional elevation of a modified form of metering control taken on the line 7—7 of Figure 8.

Figure 8 is a sectional plan view on the line 8—8 of Figure 7.

Figure 9 is a sectional plan view of a fuel input valve embodying a modified form of my invention.

Figure 10 is a vertical section on the line 10—10 of Figure 9.

Figure 11 is a vertical section on the line 11—11 of Figure 9.

Figure 12 is a top plan view of a portion of the apparatus as indicated by the line 12—12 of Figure 10.

Figure 13 is a vertical section at right angles to the section shown in Figure 10 and is taken on the line 13—13 of Figure 12.

Figure 13A is a fragmentary vertical section on line 13A—13A of Figure 12.

Figure 14 is a sectional view on a smaller scale taken on line 14—14 of Figure 9.

Figure 15 is a diagram showing the device of Figure 9 connected to a furnace system.

Figure 16 is a longitudinal section through an equalizer burner valve.

Figure 17 is a fragmentary section of the left-hand portion of the device shown in Figure 10 showing a modified form of throttling valve control.

Figure 18 is a section on the line 18—18 of Figure 11.

Referring now to Figure 1, 1 represents a casing having an inlet 2 and discharge 3 through which the fluid flows. Within the casing there is an orifice 4 forming a primary constricted area. Between this orifice and the discharge 3 there is arranged a cylindrical core 6 which in cooperation with the cylindrical inner wall of the casing 1 forms an annular channel 5, which channel is the resistor previously mentioned.

7 is a compound cylinder containing the pressure piston 8 and the compensating piston 9 connected by the rod 10. A conduit 74 connects the chamber I intermediate the orifice 4 and resistor 5 to the chamber C acting on the compensating piston 9. A conduit 75 connects the chamber O external to the orifice 4 with the chamber P exerting pressure on the pressure piston 8. A conduit 76 connects the chamber R' external to the resistor 5 with the chamber M in the compound cylinder 7 between the two pistons.

For the purpose of illustration, assume that the area of the compensating piston 9 is twice the area of the pressure piston 8 and that the construction of the resistor 5 is such that (3) $\quad r = R$ Assume also that the discharge 3 is sufficiently large so that the chamber R' has zero pressure and consequently the chamber M also has zero pressure.

Referring now to Figure 1, it will be evident that the upwardly directed force acting on the pressure piston 8 is equal to the summation of the difference in pressures around the orifice 4 and the difference in pressures around the resistor 5 acting on the unit area of the pressure piston 8. It will also be apparent that the downwardly acting force on the compensating piston 9 is equal to the difference in pressures around the resistor 5 acting on the area of the piston 9 which, by assumption, is twice the unit area of the piston 8. The above facts may be represented by the following equations:

(4) $\quad +F = AG^2 + R.V.G. + R.V.G.$ (5) $\quad -F = 2\ R.V.G.$

Subtracting the two equations to get the net force acting on the pistons 8, 9 results in obtaining the following equation:

(6) $\quad +F\text{ (net)} = AG^2$

From the above it will be observed that the net force acting on the piston system in an upwardly direction is proportional to the square of the rate of flow and is independent of the viscosity effect.

It will also be apparent from the equations heretofore given and from Figure 1 that in every case compensation in the system will follow when (7) $\quad \dfrac{R}{r} = \dfrac{\text{Area compensating piston}}{\text{Area pressure piston}} - 1$ Thus any flow apparatus which is constructed to maintain the relationship set forth in Equation (7) will operate independently of the viscosity effect in the primary constriction or orifice.

It should be pointed out that there is necessarily a certain "velocity head" developed at the entrance of the resistor, setting up a magnified counter force on the piston system, and it is therefore important that the resistor be so constructed as to make this negative "velocity head" very small. Thus as previously stated, it is desirable that the resistor take the form of an annular channel since this form presents the largest "wetted surface", although it is to be understood that any other form of resistor resulting in a small negative "velocity head" can also be used. One of the advantages of the annular form of resistor is that it may be accurately constructed, and another advantage is that it lends itself readily to the formation of a resistor which is variable along its length as will hereinafter be more fully set forth.

It must be understood that the shape of the orifice or restriction in a stream of fluid does not alter the fundamental Equation (7). Any restriction in an enclosed channel carrying a flow sets up a difference of pressure, that is, a sum of the "velocity head" and a resistance pressure as found in pipes. Constructions of the type of "Venturi tubes" follow the same law and are not excepted in this invention.

The system diagrammatically illustrated in Figure 1 may be readily used for a great many types of practical apparatus both for metering the flow and for controlling the flow. The invention is particularly useful for combustion control and association with automatic temperature control apparatus now in universal use. Automatic response of my invention to external directing forces in determining rate of flow is not confined to combustion control but has a field in manufacturing and handling of viscous fluids. It should also be pointed out that many of the features of construction described hereinafter in connection with various modifications of my invention are susceptible of use with different types of apparatus than are herein specifically described.

Figure 2 illustrates my invention in the form of a metered control adapted to deliver a fixed quantity. It will be noted that this construction is quite similar in principle to that illustrated in Figure 1 except that the fluid passageway is now incorporated within the piston system to make a more compact structure. In Figure 2, as well as in subsequent figures, the same reference characters are used wherever possible as long as the same function is performed even though the structural elements may vary considerably in their external form. Thus it will be noted that in Figure 2 the pressure piston 8 and the compensating piston 9 are connected by a tie rod 10, the external diameter of which is of the same diameter as the piston 8, and the entire piston system has a central passageway 101 in which the partition wall 102 containing the orifice 4 is located. The outer annular surface 103 of the piston 9 instead of closely fitting the cylinder bore 104 in which it is located is spaced therefrom by a sufficient distance to form the annular channel 5. The length of the annular surface 103 is also selected to give the required difference in pressure between the chamber C and the chamber M to form a resistor in accordance with my invention. The inlet 2 is now arranged in the outer casing 7 and communicates through an annular channel 12 with a series of ports 11 extending through the walls of the piston 8. The discharge 3 is also arranged in the casing 7 to communicate directly with the chamber M.

In this construction it will be observed that fluid entering the inlet 2 passes through the annular channel 12 and the ports 11 to the interior of the piston 8 where it flows through the orifice 4 into the interior of the piston 9 into the chamber C. The fluid then flows through the annular channel 5 to the chamber M and out through the discharge 3. Thus it will be observed that the orifice 4 and resistor 5 are in series and that the piston system is subject to the same differential pressures as in Figure 1. Since the flow of the fluid is upwardly through the interior of the piston system the net lifting force is in an upward direction as illustrated by the arrow 105 and this force operates against the weight of the piston system. The ports 11 in conjunction with the annular chamber 12 have a throttling action and it will be apparent that the flow of fluid will be maintained at that amount wherein the net pressure on the piston 8 balances the weight of the piston system. It will also be understood from the previous discussion that the viscosity effect due to the orifice 4 may be entirely nullified when the apparatus is constructed in accordance with Equation (7).

Figures 3, 4 and 5 illustrate a modified form of my invention adapted for use as a meter having a lineal scale. The general arrangement of the orifice, resistor and piston system is similar to the construction illustrated in Figure 2, but instead of having a fixed orifice as in the preceding examples, this modification is provided with a variable orifice and a variable resistor.

In the construction as shown, an outer casing 1 is provided with an inlet 2 at the lower end thereof which communicates directly with the interior of the pressure piston 8. The pressure piston is slidable in the sleeve 106 which takes the place of the outer casing 7 of Figure 1. A partition wall 14 within the pressure piston has a circular opening to permit the piston to slide on the central rod 15 threadedly secured to the casing. This rod has a groove 107 of uniformly increasing depth cooperating with the opening in the partition 14 to form the variable orifice 4. The compensating piston 9 is in this instance formed separate from the pressure piston and consists of a sleeve 108 surrounding the sleeve 106 and spaced therefrom. The sleeve is slidable within the cylinder 109 and is provided with an inwardly extending flange 110 adapted to seat upon the outwardly extending flange 111 of the pressure piston 8, there being preferably a gasket 22 between the parts. The outer cylindrical surface of the sleeve 108 is provided with a series of vertical channels 112 spaced circumferentially forming lands 113 intermediate the same. The edges 114 of the channels are curved in a longitudinal direction as illustrated in Figure 5 thereby varying the width of the channel from a minimum value at the top of the sleeve to a maximum value as indicated at 115 at a point intermediate the ends of the sleeve. The series of circumferentially spaced variable channels 112 in cooperation with the cylinder 109 form the resistor 5. It will be observed that the lower portion 112f is of constant width while the upper portion 112v is of changing width. The casing 1 is enlarged at the point 116 above the top of the piston 9 when the latter is in its lowermost position.

In operation the liquid enters through the inlet 2, passes upwardly through the variable orifice 4 into the chamber C formed by the enlargement 116. It then passes downwardly through the series of variable channels 112 and out through the discharge 3. The piston system, including the pressure piston 8, the compensating piston 9 and the annular sleeve 108, will be moved upwardly by the pressure of the fluid and will come to rest when the pressure effect of the flow balances the weight of the piston system. Since the weight is constant, the area of the variable orifice, and hence the stroke of the pistons to produce such variation, indicates the quantity of flow. It will be evident that the resistance factor R of the orifice 4 will vary with the area and stroke of the system and therefore the resistance factor r of the resistor must vary in proportion therewith. The resistance developed by the portion 112f of the channels 112 is proportional to that of the maximum area of the orifice corresponding to the top of the stroke of the piston system. The channel portion 112f will be exposed to the enlarged chamber C when the piston system is at the top of the stroke. The lowering of the piston system therefore both increases the length of the resistor and reduces the primary area of the system.

The indication of the flow is obtained by providing a rod 19 attached to the compensating piston 9 carrying a circular disk 18 sliding within a glass tube 17. This may be indicated on the scale 117 or by other suitable means. Apparatus is commercially available to electrically indicate the position of the piston and the flow, and this can be utilized in conjunction with my invention when found desirable.

A modified form of my invention as illustrated in Figure 6 forms a balancing type meter in which a manual adjustment is required. The construction as illustrated differs from the preceding forms of the invention in that flexible diaphragms are used in place of pistons. In some instances this is more practical since the stroke of the diaphragm system is of minor magnitude. As illustrated, the casing 1 is in the form of an enlarged casing having a central cavity 118 of sufficient size to hold a relatively large amount of fluid, thereby permitting all of the operating parts to be bathed in a relatively large amount of fluid, thus equalizing the temperature of the metering parts. In this construction the partition wall 14 is fixed within the upper portion of the casing and the metering rod 15 is adjustably positioned within the partition thereby fixing the size of the orifice 4 for any given setting. The adjustment of the metering rod is provided by a pinion 25 engaging a rack 119 on the lower end of the metering rod. The setting of the metering rod is accomplished by rotating the pinion 25 and is measured by the pointer 26 on the dial index 120.

Depending from the upper portion of the casing into the central cavity 118 is an annular sleeve 121. Cooperating with this sleeve is a cup-shaped member 122 secured to the rod 15 by the fastener 123. The inner cylindrical surface 124 of the cup-shaped member slidingly engages the outer cylindrical surface 125 of the sleeve 121. A plurality of circumferentially spaced channels 126 are formed in the surface 125 between the lands 127 engaging the surface 124. (See Figure 6A). These channels increase in width from the top to the bottom and correspond to the variable channels 112v of Figure 5. Within the sleeve 121 is adjustably mounted a cylindrical core 128 having a central bore for the metering rod 15. The outer surface 129 of the core 128 (see Figure 6B) has a plurality of circumferentially spaced channels 130 forming intermediate lands 131 which engage the inner cylindrical surface of the sleeve 121. The channels 130 are of uniform width and correspond to the portion 112f of Figure 5.

When the pin 15 is adjusted longitudinally to vary the size of the orifice 4, the cup-shaped member 122 is also adjusted, thereby varying the engagement of the channeled surface 125 with the member 122 and exposing a proportional amount of the variable channels 126 while maintaining a fixed resistance in the channels 130. This effect corresponds to that previously described in connection with Figures 3 and 5 and is for the purpose of proportioning the resistance factors $r$ and $R$.

Extending across the central cavity 118 of the casing 1 are three diaphragms 9d, 8d and 20d. These are connected together by a strut 10 offset with respect to the pin 15 to provide clearance. The passageway 74 formed within the walls of the casing communicates between the chamber H and the chamber C, the latter being between the diaphragm 9d and the casing. The central chamber M between the diaphragms 9d and 8d communicates with the inlet 2. The chamber P between the diaphragms 8d and 20d communicates with the discharge through the conduit 75. It will be noted that in this case the flow of the fluid is reversed since it enters the chamber M through the orifice 2, flows first through the resistor 5, then through the orifice 4 and is finally discharged through the port 3. Comparing this flow with that of Figure 1 it will be noted that the relation of the parts is identical but the pressures result in tension on the tie rod 10 instead of compression. The net force on the diaphragm system is therefore from diaphragm 9d towards diaphragm 8d as indicated by the arrow 105.

This net diaphragm force is transmitted to the diaphragm 20d resulting in an excess of pressure in the chamber S over that in the chamber P. The chamber S communicates with the mercury well 18 of a manometer 132, the tube bend 133 of which communicates with the chamber P. The tube as well as the various chambers are all filled with the liquid flowing through the device.

In the operation of the device the instrument is cut into the flow of fluid which is desired to be measured and the pointer 26 is rotated to balance the column of mercury at a given point on the scale. The manometer may preferably be calibrated to show a series of graduations X1, X2 and X3 corresponding to different specific gravities. The instrument may also be constructed with multipliers of its scale, one of the multipliers being indicated at Y1, Y2 and Y3. Thus by adjustment of the pointer 26, the column may be balanced at a certain specific gravity of one of the multiplying sections of the scale.

Figures 7 and 8 show a further modified form of my invention adapted in particular to fuel oil control installations of the on-off type. In such installations the fuel input is a fixed quantity but many types of oil burning installations of this type demand varying capacities and in my device hereinafter described the orifice system is interchangeable to provide for such variations.

In this construction the general arrangement is somewhat similar to that illustrated in Figure 6 since the casing 1 has a central cavity 118 arranged to contain the operating parts in such a manner that they all will be bathed in a relatively large amount of fluid. In the upper part of the casing the partition wall 14 is held in position by the annular sleeve 121 which threadedly engages the casing and depends into the central cavity. At the bottom of the casing there is an enlarged opening 134 of sufficient size to permit the sleeve to be inserted, and this opening is closed by the threaded cap 135. 136 is a cylindrical core having lands 137 slidably engaging the inner surface of the sleeve 121. Intermediate the lands are straight-sided channels 138 of constant width which form the resistor of the apparatus. A rod 139 projects upwardly from the member 136 and has a slot 140 of uniform dimensions which in cooperation with the partition wall 14 forms the fixed orifice 4. The member 136 is loosely held within the sleeve 121 by the boss 141 on the cap 135. The diaphragm system 8d, 10, 9d and the passageways 74 and 75 are the same as in Figure 6. The purpose of this device is to provide a throttling control for the fluid, and as shown this comprises a ball valve 34 and seat 35 arranged adjacent the inlet 2. A lever 32 within the casing has one arm provided with a cage 31 for receiving and actuating the ball valve 34 and the other arm 142 engaging the diaphragm 9d. A spring 33 extends from the first arm of the lever 32 and is engaged by an adjustable screw 27, the head of which projects through the walls of the casing for manual adjustment.

In the operation of this device the pressure effect of the flow of fluid is in normal balance with the force of the spring 33 obtained by the adjustment of the screw 27. The spring tends to open the valve while the diaphragm 9d tends to close the valve. Any unbalance in the system will cause the opening or the closing of the balance valve 34, thereby accurately controlling the flow of fluid.

Another modified form of my invention is illustrated in Figures 9 to 18. This device is in the form of a fuel input valve adapted to deliver oil to a burner system determined by the square root of the pressure of the combustion air supplied to the burners. The construction is of the same general type as illustrated in Figure 6 but is provided with additional features adapting the same for insuring an accurate controlling system for an automatically controlled metallurgical furnace.

Referring now to Figure 10, the casing 1 has a central cavity 118 for receiving the operating parts of the metering system. The casing is provided with a removable top 43 to which is attached the parts of the apparatus forming the adjustable orifice and the adjustable resistor. Thus the partition wall 14 is retained in the cap by the annular sleeve 121 which threadedly engages the cap. The cup-shaped member 122 is now carried by a lifting screw 25 threadedly engaging the boss 150 and having the head end thereof at the upper end of the cap 43 as illustrated in Figure 13. The metering pin 15 is secured to the cup-shaped member by fastening means 123 but terminates at this point and does not extend downwardly as in Figure 6. Otherwise the construction of the elements of the resistor is the same as illustrated in Figure 6 and the description will not be repeated. The diaphragm system 9d, 10, 8d is also similar to that shown in Figure 6 except that the diaphragm 20d is now omitted.

The inlet 2 is provided with a ball valve 34 and seat 35 in the same manner as illustrated in Figure 8 and the valve is operated by a lever 32 which however instead of being directly actuated by the diaphragm 9d is now connected to an auxiliary diaphragm 36. The casing 1 is provided with a partition wall 151 forming an inlet chamber 152 into which the fluid from the inlet 2 first passes. The diaphragm 36 has one side thereof subjected to the pressure in the inlet chamber 152 and is secured to the casing by a cap 153 forming a chamber 154 on the opposite side of the diaphragm. A passageway 155 connects the chamber 154 with the central cavity 118 thereby equalizing the pressures in these chambers. Communication between the inlet chamber 152 and the central cavity 118 is provided by means of the pressure valve 37 which, as shown, comprises a tube 156 extending through the partition wall 151 and having a series of radial ports 157. A slidable sleeve 158 is arranged within the tube 156 and is adapted to move within the tube by means of the lever 159 which in turn is freely mounted on the shaft 40. The outer end of the lever 159 carries a pin 38 adapted to contact with the center plate of the diaphragm 9d. A spring 39 fixedly secured to the shaft 40 bears against the pin 38 and holds the latter in contact with the center plate of the diaphragm. The shaft 40 extends outwardly through the casing 1 and has fixedly secured thereto a lever 41 which in turn abuts a push rod 42 extending longitudinally beneath the casing. The push rod 42 is adapted to be moved in accordance with the pressure of the air supply or by any other suitable controlling force and the preferred construction will now be described.

The cap 160 which retains the diaphragm 8d in position on the casing has a plurality of lugs 54 extending outwardly therefrom. A ring 162 is mounted on the lugs. A diaphragm 163 extends across the ring 162 and is retained in position by a cap 164 and retaining screws 161 which threadedly engage the lugs 54. The cap 164 is recessed forming a chamber 165 on one side of the diaphragm 163 into which air pressure may enter through the port 57. The lugs 54 are grooved to receive the circumference of a split ring 52. The ring terminates at one end in a lug 166 having a threaded aperture for receiving a threaded pin 53. The other end of the ring has a laterally extending portion 167 terminating in the lug 168, spaced from the lug 166 and having an aperture 169 for receiving the end of the pin 53. Thus by adjusting the threaded pin 53 the lugs 166 and 168 may be spread thereby frictionally engaging the ring 52 in the grooved lugs 54. 51 is a hinge arranged between the lugs 166 and 168 and using the pin 53 for its pivot. Extending from the hinge is a member 50 which extends in alignment with the center of the diaphragm 163 and has a return bent portion 170 of arcuate shape. The center plate of the diaphragm 163 has a projecting portion 171 adapted to bear against the member 50. The push rod 42 hereinbefore described abuts the arcuate member 170.

With the adjustable hinged arrangement as described it will be observed that by loosening the threaded pin 53 the ring 52 may be rotatably adjusted in the lugs 54 thereby rotatably adjusting the hinge 51 and consequently changing the effective leverage on the push rod 42. With the parts in the position as illustrated the effective leverage on the diaphragm 163 and the push rod 42 is the same, but by adjusting the hinge rotatively the leverage effective on the push rod 42 is increased or decreased over that effective on the diaphragm. This adjustment makes it possible to compensate for differences in combustion air pressures in the initial setting of the apparatus.

On the cap 164 is arranged a proportioning valve 172 adapted to determine the air pressure in the chamber 165. As shown, this comprises a cylinder 173 having two conduits communicating therewith designated 58 and 59. A piston 60 within the cylinder is so arranged as to simultaneously uncover a portion of each of the conduits and permit communication with the recessed intermediate portion 174 of the piston. The aperture 57 in the cap also communicates with this recessed portion of the piston. An adjustment screw 62 is adapted to move the piston to vary the proportion of the fluid entering the proportioning valve.

In order to clear the central cavity 118 of accumulation of gases a suitable relief valve is provided. As shown, the cap 43 is provided with a shouldered vertical passage 175 extending from the cavity 118 into the passageway 75. The passageway 75, as in the preceding examples, extends between the chamber P on the outside of the minor diaphragm 8d and the chamber O above the orifice 4 and consequently communicates directly with the discharge 3 by means of the downturned passageway 176. The valve 45 is actuated by means of a lever 46 arranged within the central cavity 118 and pivoted on the pin 48. The other end of the lever 46 is provided with a float 47, the arrangement being such that whenever the liquid level falls through an accumulation of gases the valve 45 is opened and permits such gases to escape through the port 75 and the discharge 3.

There is also provided a manually adjustable by-pass from the cavity 118, this being in the form of an adjustable screw 44, the head of which extends through the top of the cap. The lower end of the screw forms a valve cooperating with the conical valve seat 177 to close or open an auxiliary vertical passageway 178. The upper end of passageway 178 has a laterally extending bore 179 communicating with the port 75. The opening of the by-pass is sometimes advisable in the initial firing of a cold furnace. In the operation of the fuel input valve as thus far described, the fluid enters through port 2, flows past ball valve 34 into the inlet chamber 152 and then passes through the pressure valve 37 into the central cavity 118. The fluid then passes downwardly through the variable channels 126 of the resistor into the cup-shaped member 122, then upwardly through the channels 130 of the resistor. It then flows through the orifice 4 into the chamber O and out through the discharge 3. This flow of fluid creates a tension in the diaphragm system 8d, 10, 9d in the direction of the arrow 105, that is, towards the minor diaphragm 8d. This pressure is then transmitted through the spring 39 to the rod 40 and tends to oscillate the same in one direction. This oscillation, however, is resisted by the force transmitted to the rod 40 by the lever 41 and push rod 42 which, as previously explained, is derived from the air pressure acting on the diaphragm 163. Thus the pressure due to the liquid flow and the pressure obtained from the air flow are balanced against each other through the spring 39 which tends to eliminate slight fluctuations. The free lever 159 which actuates the pressure valve 37 is also responsive to the movement due to the balanced forces above mentioned since the pin 38 attached thereto is intermediate the diaphragm 9d and the spring 39 and therefore exerts a throttling effect between the chamber 152 and the cavity 118. This in turn creates a differential pressure on the diaphragm 36 and actuates the lever 32 to open or close the ball valve 34. It will thus be understood that my device balances the air pressure against the fluid pressure and governs the amount of fluid entering the device accordingly.

Figure 15 illustrates diagrammatically a preferred method of utilizing the fuel input valve just described in connection with automatic temperature control mechanism of a metallurgical furnace. It also illustrates two different types of oil burners and the association with a motorized air control energized and directed by thermometric instruments. The instruments themselves are not illustrated, nor is the furnace since they may be of any suitable type and are not essential to the understanding of the invention.

The combustion air enters through the trunk line 63 from a suitable source and is distributed to the burner 66 through a branch pipe 180 and to burner 66a through branch 181. The oil enters the casing 1 of my fuel input valve through the inlet 2 and leaves through the discharge 3, being distributed to the burner 66 by a conduit 182, equalizer burner valve 69 and conduit 73. It is similarly distributed to burner 66a by conduit 183, equalizer burner valve 69 and conduit 73. The trunk line 63 is provided with a valve 64 mechanically operated by suitable mechanism not illustrated in detail but diagrammatically represented at 65. This form of motor controlled valve is well understood in the art and the position of the valve is determined by thermometric instruments in the metallurgical furnace.

An air line conduit 67 communicates with the trunk line in advance of the valve 64 and is provided with a manually operable valve 68. One branch from the conduit 67 is connected to the pipe 58 of the proportioning valve previously described. The other pipe 59 of the proportioning valve is connected to the branch air line 180 posterior to the valve 64. Thus the pressure effective on the diaphragm 163 of the fuel input valve is some definite proportion of the trunk line pressure and the pressure of the air flowing to the burner. This proportion may be suitably adjusted by the adjusting screw 62 as hereinbefore described. The equalizer burner valve 69 is shown in detail in Figure 16. It comprises a cylinder 184 in which a piston 185 is longitudinally adjustable by means of a threaded stem 186 engaging the correspondingly threaded head 187. The piston has a spiral groove 188 in the periphery thereof through which the oil is required to flow from the annular channel 189 to the discharge orifice 190. By rotatably adjusting the piston 185 through the handle 191 the length of the spiral groove between the inlet and discharge may be varied, consequently varying the resistance to the passage of the oil. 72 is a shut-off valve.

In order to understand the operation of the system as illustrated in Figure 15, it should be remembered that the valve 64 will assume predetermined positions by direction of the thermometric instruments, ranging from a wide open position during the starting of the furnace to a closed position when the furnace ceases to be in operation. Intermediate positions of the valve will be obtained in order to exactly regulate the amount of air delivered to the furnace under changing temperature conditions. The quantity of oil passed by the metering control device is determined by some proportion of the combustion air pressure and is not determined solely by the pressure delivered to the burner valve 66. This is for the reason that at times of low combustion rate in the furnace external air flows into the furnace through burner ports and other leakages. This influx tends to produce an oxidizing atmosphere. To retain the true proportion of air and fuel for ideal combustion, the arrangement which I have illustrated makes it possible to enrich the combustion at low firing rates and to make this enrichment readily controlled by the operator without permitting the operator to alter the normal combustion mixtures during the normal firing of the furnace.

Referring again to Figure 15, it will be apparent that if the valve 64 were closed air would flow through the pipes 67 and 58 to the proportioning valve and thence through pipe 59 and conduit 180 to the burner valve 66, although the amount of flow through the mixing valve is negligible. However, there would still be a definite pressure in the chamber 165 acting on the air pressure diaphragm 163 and this pressure would produce a certain oil flow through the apparatus. It will also be noted that if the valve 64 were wide open pressures in 58 and 59 would be substantially equal and the pressure effective on the air pressure diaphragm 163 would be the pressure of the burner system. Due to the square root effect of the air pressure the enrichment adjustment practically disappears at a 50% fuel input.

In Figure 15 I have also illustrated a second type of burner 66a which is of the dual air type. The secondary air supply is introduced through a conduit 192 from the conduit 68 which in turn receives its supply in advance of the controlling valve 64. The secondary air supply is therefore never under the automatic control.

A modification of the device shown in Figure 10 is illustrated in Figure 17. The only change from the device of Figure 10 is in the form of the throttling valve which replaces the diaphragm 36, lever 32 and ball valve 34. As shown in this construction the partition wall 151 divides the cavity 118 from an inlet chamber 152 as in the preceding device. The throttling valve 37 is the same as before but is located at a lower portion of the chamber 152. Instead of the diaphragm 36 there is now provided a piston 193 vertically slidable in a sleeve 194. A port 155 establishes communication between the head of the piston and the central cavity 118. The valve body 195 has an inlet port 196 registering with the fluid inlet 2. The valve consists of a rod 197 having a threaded portion 198 engaging the valve body 195. The valve has a groove 199 therein and the arrangement is such that rotation of the same will expose a variable amount of the groove and thus vary the amount of fluid which can flow from the valve body to the chamber 152. The rotation of the valve is by means of a sprocket 200 on the end of the valve. A chain 201 passes over the sprocket and one end thereof is secured at 202 to the piston, while the other end thereof is attached to a coil spring 203 which in turn is secured to the casing 1 as indicated at 204.

In the operation of the device, fluid entering through the throttling valve 197 passes through the pressure valve 37 which creates a difference of pressure between the chambers 152 and 118, thus moving the piston 193 which in turn rotates the valve 197 and varies the amount of fluid entering chamber 152. It will be noted that the closing of the throttling valve is the result of upward motion of the piston 193 in response to a decrease in the area of the pressure valve 37. This upward motion of the piston reduces the flow through the pressure valve automatically reducing the effect of the same and anticipates the new position. Such anticipation eliminates "hunting" in the throttling valve. The closing action also creates increase in the counter-pull of the spring 203 cooperating in anticipation effect. It will be noted that movement of the piston 193 does not alter the flow through the metering device of the control.

The fuel input valve of the system connected thereto as illustrated in Figures 9 to 18 have many advantages over the prior art. In the first place the viscosity effect is eliminated in accordance with the principles previously described. It should also be noted that the throttling valve in actual control of the flow is self-cleaning, automatically opening to produce a definite flow. The metering orifice and passageways are of such size throughout that granular carbon (which is present in all modern fuel oil) can not clog the same in contradistinction to present-day devices using small tapered orifices for controlling the oil supply. In my apparatus the quantity of fuel oil delivered to a group of burners is automatically determined by the combustion air pressures whether the variations in pressure are accidental or produced by direct intent. My invention meets the modern tendency towards a "floating" combustion rate. In conjunction with motorized air valves under the direction of thermometric instruments, my metered controls will automatically deliver fuel in proportion to the air.

In my device, the air directed force may be standardized to meet the variable conditions of combustion air pressures found in different plants. When fuel oil of very low viscosity is used the standard push rod pressure on the rod 42 may be reduced, larger metering systems equalizing the output.

My device provides for the enrichment of the combustion mixture at low combustion rates without affecting the adjustment under normal conditions. This is by means of the mixing valve 62, but as previously explained this enrichment is entirely nullified at higher rates because of the equalization of pressures on the opposite sides of the throttling valve 64 where the latter is open.

The equalizer burner valves used in conjunction with the individual burners of a group compensate for the difference in resistance to oil flow because of different lengths of pipe and other factors. This compensation is provided without the use of needle valves and in such a manner that the passages can not become clogged. The equalizer has a back pressure proportioned to the flow and offers material opposition at low rates.

It should be understood that while Figure 15 shows two burners under the same control, the number of burners may be varied at will depending upon the furnace construction.

It will be noted that in the construction illustrated in Figure 6, as well as that illustrated in Figures 9 and 10, the orifice rod 15 has a variable groove therein and the resistor is made up of two parts, one having variable channels, and the other having channels of fixed dimensions.

It will be evident that the resistance factor "R" of the orifice will vary with the area, and stroke of the system, and that the factor "r" of the resistor must vary in proportion therewith. The resistance developed by the channels 130 is proportional to that of the maximum area of the orifice 4. When the rod 15 and the cup-shaped member 122 are in their lowermost positions, the widths of the channels 126 are developed so that the additional resistance due to the decreasing area of the orifice will add a proportional resistance to the resistor system. The raising of the rod 15 and the cup-shaped member 122 therefore both increases the length of the resistor and reduces the primary area of the system. In order to calibrate the instruments shown in Figures 6 and 10, the adjustable core 128 which has the fixed resistor channels 130 therein is adjusted longitudinally with respect to the sleeve 121 while the cup-shaped member 122 is in its uppermost position until the proper proportion between the resistance of the fixed channels 130 and the variable channels 126 is obtained, this proportion depending upon the maximum and minimum orifice areas due to the extreme movement of the rod 15. When the desired proportion is obtained, the core 128 is suitably secured to the sleeve 121 by a pin 122a. The rod 15, which is threadedly secured to the cup-shaped member 122, is thereupon adjusted so that the resistance factor "R" is exactly proportional to the resistance factor "r", the latter being the summation of the fixed resistance of the channels 130 and the variable resistance of the channels 126. When the proper adjustment is obtained, the rod is fixed to the member 122 by the pin 123. This method of calibration insures a very accurate apparatus which will exactly nullify the viscosity effect of the fluid. It is also possible to determine these factors mathematically.

One of the features of the fuel input valve of Figures 9 and 10 is that the position of the valve is determined by the balancing of the force due to the flow of the fluid with an external directing force and utilizing any unbalance of the system for automatic control. As shown, the directing force is the combustion air pressure but the invention in its broader aspects may utilize any other force such, for example, as the steam pressures in oil fired power plants. It is therefore to be understood that the invention is not to be considered as limited to the specific embodiments herein described but the scope of the invention is to be construed by the claims appended hereto.

Certain features illustrated and described in this application but not claimed herein form the subject-matter of my co-pending application, Serial No. 122,251, filed January 25, 1937.

What I claim as my invention is:

1. The combination of a passageway for a viscous fluid, said passageway having a constricted area, means in said passageway for creating a resistance to flow of said viscous fluid, said resistance being a function of length, a movable element having pressure responsive faces of different areas and means for urging said element in opposite directions by the pressures within said passageway on opposite sides of said constricted area on the one hand and on opposite sides of said resistance means on the other hand.

2. The combination of a passageway for a viscous fluid, said passageway having a constricted area, means in said passageway for creating a resistance to flow of said viscous fluid, said resistance being a function of length, a movable element having pressure responsive faces of different areas, means for urging said element in opposite directions by the pressures within said passageway on opposite sides of said constricted area on the one hand and on opposite sides of said resistance means on the other hand and means operably connected to said movable element for automatically varying the flow through said passageway.

3. The combination of a passageway for a viscous fluid, means in said passageway forming a variable constricted area, means in said passageway for creating a variable resistance to flow, which resistance is a function of length, means for simultaneously moving said resistance means and said constricted area means to proportionately vary the same, a movable element having pressure responsive faces of different areas, means for urging said element in opposite directions by the pressures within said passageway on opposite sides of said variable constricted area on the one hand and on opposite sides of said resistance means on the other hand, and means operatively connected to said movable element for automatically varying the flow through said passageway.

4. The combination of a passageway for a viscous fluid, said passageway having a constricted area, means in said passageway for creating a resistance to flow of said viscous fluid, said resistance being a function of length, a movable element having pressure responsive faces of different areas, means for urging said element in opposite directions by the pressures within said passageway on opposite sides of said constricted area on the one hand and on opposite sides of said resistance means on the other hand and means to register the force produced by said movable element.

5. The combination of a passageway for a viscous fluid, means in said passageway forming a variable constricted area, means in said passageway for creating a variable resistance to flow, which resistance is a function of length, means for simultaneously moving said resistance means and said constricted area means to proportionately vary the same, a movable element having pressure responsive faces of different areas, means for urging said element in opposite directions by the pressures within said passageway on opposite sides of said variable constricted area on the one hand and on opposite sides of said resistance means on the other hand, and means to register the force produced by said movable element.

6. The combination of a passageway for a viscous fluid, said passageway having a constricted area, means in said passageway for creating a resistance to flow of said viscous fluid, said resistance being a function of length, a movable element having pressure responsive faces of different areas, means for urging said element in opposite directions by the pressures within said passageway on opposite sides of said constricted area on the one hand and on opposite sides of said resistance means on the other hand, and means to balance the force of said movable element against an external directing force.

7. The combination of a passageway for a viscous fluid, said passageway having a constricted area, means in said passageway for creating a resistance to flow of said viscous fluid, said resistance being a function of length, a movable element having pressure responsive faces of different areas, means for urging said element in opposite directions by the pressures within said passageway on opposite sides of said constricted area on the one hand and on opposite sides of said resistance means on the other hand thereby obtaining a net force urging said element in one direction due to the flow of the fluid through said passageway and means for applying a force from an external source to said movable element in opposition to said net force.

8. The combination of a passageway for a viscous fluid, means in said passageway forming a variable constricted area, means in said passageway for creating a variable resistance to flow, which resistance is a function of length, means for simultaneously moving said resistance means and said constricted area means to proportionately vary the same, a movable element having pressure responsive faces of different areas, means for urging said element in opposite directions by the pressures within said passageway on opposite sides of said variable constricted area on the one hand and on opposite sides of said resistance means on the other hand thereby obtaining a net force urging said element in one direction due to the flow of the fluid through said passageway and means for applying a force from an external source to said movable element in opposition to said net force.

9. The combination of a passageway for a viscous fluid, means in said passageway forming a variable constricted area, means in said passageway for creating a variable resistance to flow, which resistance is a function of length, means for simultaneously moving said resistance means and said constricted area means to proportionately vary the same, a movable element having pressure responsive faces of different areas, means for urging said element in opposite directions by the pressures within said passageway on opposite sides of said variable constricted area on the one hand and on opposite sides of said resistance means on the other hand thereby obtaining a net force urging said element in one direction due to the flow of the fluid through said passageway, means responsive to an external fluid pressure for applying a force to said movable element in opposition to said net force and means for adjustably varying the force of said pressure responsive means with respect to said net force on said movable element.

10. In an apparatus of the class described, a fluid inlet chamber, a secondary chamber, an automatically controlled pressure valve intermediate said inlet and secondary chambers, a pressure responsive element normally urged in one direction and having its opposite faces subjected to the pressure of the said inlet and secondary chambers respectively, an inlet valve movably mounted to regulate the flow into said inlet chamber, and means actuated by said pressure responsive means for moving said inlet valve.

11. In an apparatus of the class described, a fluid inlet chamber, a secondary chamber, an automatically controlled pressure valve intermediate said inlet and secondary chambers, a pressure responsive element normally urged in one direction and having its opposite faces subjected to the pressure of the said inlet and secondary chambers respectively, an inlet valve rotatably adjustable to determine the flow into said inlet chamber, and means actuated by the movement of said pressure responsive means for rotating said inlet valve.

12. A fluid metering device comprising a casing having a cylindrical bore therein, a sleeve within said cylindrical bore forming a second cylinder, a hollow piston slidable in said second cylinder having a partitioned wall therein containing an orifice, said casing having an inlet communicating with said hollow piston, a rod extending through said orifice having a variable channel therein, a second sleeve slidable in said first mentioned cylinder having an inwardly projecting portion resting upon said hollow piston, said second sleeve having a series of circumferentially spaced channels in the outer cylindrical surface thereof, said casing having an outlet communicating with said channels, and an indicator carried by the second sleeve adapted to register the position of said hollow piston and said second sleeve during the flow of fluid from said inlet to said outlet.

13. A fluid control device comprising a cylindrical passageway for a viscous fluid, a partition in said passageway having an orifice therein, a cylindrical core in said cylindrical passageway having a groove therein cooperating with said cylindrical passageway to form a resistance which is a function of length, a rod attached to said cylindrical core extending through said orifice and having a groove therein of constant dimensions, a movable element having pressure responsive faces of different areas, means for urging said element in opposite directions by the pressure within said passageway on opposite sides of said orifice on the one hand, and on opposite sides of said cylindrical core on the other hand, thereby obtaining a net force urging said element in one direction due to the flow of fluid through said cylindrical passageway, and means operably connected to said movable element for automatically varying the supply of fluid to said cylindrical passageway, said cylindrical core and grooved rod being removable and replaceable by a similar device in which the channel in said core and the groove in said rod are proportioned for a different capacity.

14. A fluid control device comprising a casing having a central cavity therein and provided with inlet and outlet openings, a partition in said cavity having an orifice therein, a rod having a groove of variable size extending within said orifice, a sleeve depending into said cavity, a cylindrical core within said sleeve having a plurality of circumferentially spaced channels therein, an aperture for the passage of said rod, a cup-shaped member adjustably secured to said rod and slidably engaging the outer surface of said sleeve, said outer surface of said sleeve having a series of circumferentially spaced channels of variable width, means for simultaneously moving said cup-shaped member and said rod to vary the effective area of said orifice and simultaneously vary the effective resistance of said variable channels, a movable element having pressure responsive faces of different areas, means for urging said element in opposite directions by the pressures within said cavity on opposite sides of said orifice on the one hand, and on opposite sides of said channels on the other hand, thereby obtaining a net force urging said element in one direction due to the flow of the fluid, and a device of the type capable of measuring or controlling operatively connected to and actuated by said movable element.

HARRY G. GEISSINGER.